Figure 1:
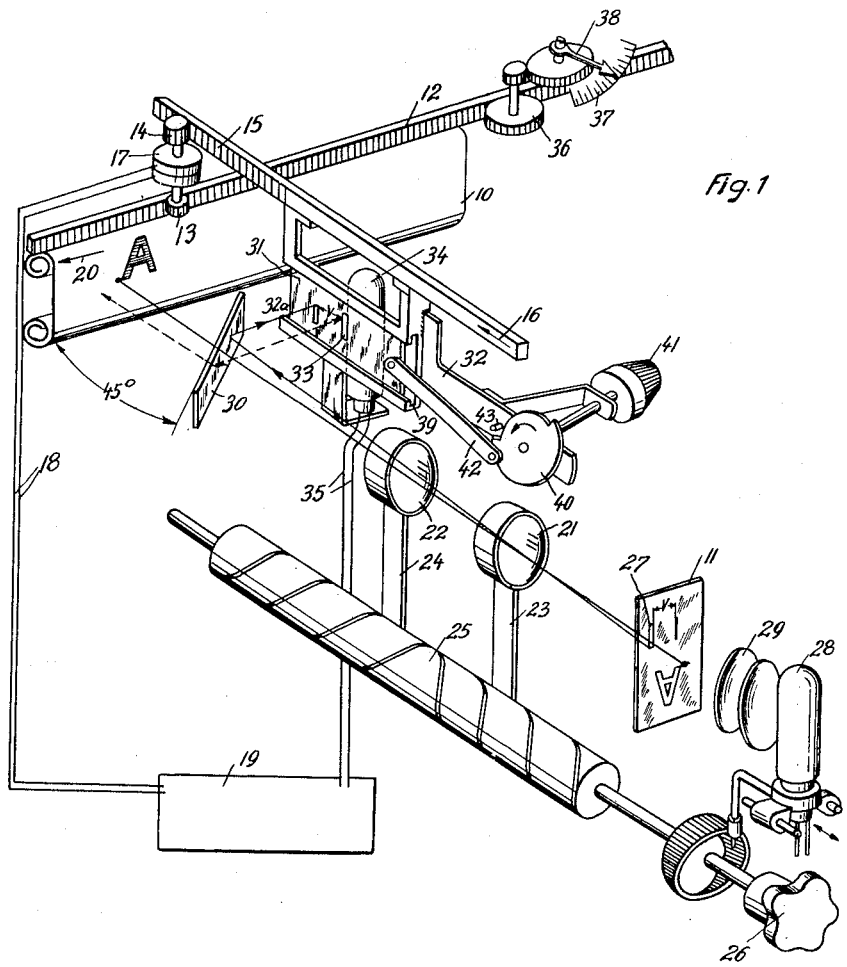

April 11, 1961  H. HEINE  2,978,969
PHOTOGRAPHIC TYPE-COMPOSING APPARATUS
Filed May 28, 1957  5 Sheets-Sheet 1

Inventor
Hugo Heine
By: [signature]
Attorney

April 11, 1961 H. HEINE 2,978,969
PHOTOGRAPHIC TYPE-COMPOSING APPARATUS
Filed May 28, 1957 5 Sheets-Sheet 3

Inventor
Hugo Heine
By,
Attorney

Inventor
Hugo Heine

United States Patent Office 2,978,969
Patented Apr. 11, 1961

2,978,969

PHOTOGRAPHIC TYPE-COMPOSING APPARATUS

Hugo Heine, 47 Fortstrasse, Braunschweig-Querum, Germany

Filed May 28, 1957, Ser. No. 662,076

14 Claims. (Cl. 95—4.5)

This invention relates to a photographic type-composing apparatus of the type disclosed in the British Patent No. 725,699.

In that photographic type-composing apparatus photographic pictures are successively taken from carriers provided with typographic symbols on a light sensitive sheet material which is intermittently moved after any exposure, means being provided to vary the photographic ratio between the sizes of the symbols and the pictures thereof and to vary the intermittent movement in dependence on such ratio, the photographic lens system comprising relatively movable elements adapted by their relative setting to variably determine the focal length, focus setting means being provided to so relatively adjust such lens elements with respect to the symbol carrier and the sensitive sheet material that the distance of said symbol carrier from said sheet material remains unaffected by a variation of the focal length, each type carrier being provided with a typographic symbol having a characteristic representative of the width of the symbol, the means for intermittently moving the sensitive sheet material being controlled by the focal setting means and by means sensing said characteristics.

It is the object of the present invention to improve such prior photographic type-composing apparatus. In the embodiment described in the above-mentioned British patent the characteristics representative of the width of the symbols comprise elongated members, i.e. three-dimensional elements. As a result, the symbol carriers are bulky and require comparatively much space. More particularly, the elongated members provided on the symbol carriers constitute a hindrance when it is desired to store the symbol carriers in a magazine in the manner of index cards. Moreover, the elongated members characteristic of the widths of the symbols are subject to wear owing to the mechanical cooperation with sensing elements.

It is the object of the present invention to eliminate such disadvantages by the provision of optical sensing means which controls the duration of the feed of the photo-sensitive sheet material and, for this purpose, projects the mark upon the photoelectric cell at an instant which is determined in dependence on the position of the mark by a movable optical element connected with the feeding means for movement thereby.

Preferably, each step of the intermittent feed movement commences at a predetermined instant of the cycle and is terminated by an impulse produced by the photoelectric cell. If desired, the predetermined instant of the cycle of operation may be adjusted in a manner common to all symbols for the purpose of composing the type with extended letter spacing.

In the embodiment of the type-composing apparatus disclosed in the above-mentioned British patent a lens system of variable focus serves to project the type symbols upon the photo-sensitive layer material, means being provided for controlling the intermittent feed in dependence on the adjustment of the focus and thus in dependence on the magnification of the symbols. Preferably, similar means are provided in the instant case, since this offers the advantage that one and the same setting element serves the dual purpose of varying the size of the projected images of the symbols and the length of the intermittent feed in proportion thereto. Therefore, the function of the optical sensing means sensing the characteristic of the symbol is influenced by the focus-adjusting means. The spacing of the projections of the symbols is increased or reduced at the same ratio as the magnification of the symbols is increased or reduced. It is desirable, however, to provide additional means for varying this spacing independently of the differential width of the symbols. Therefore, according to the present invention, the photographic type-composing apparatus is provided with a setting member for varying the length of the intermittent feed. As a result, with a given size of the projections, the letter spacing may be made larger or smaller.

A particular simple structure results if the same lens system of variable focus serving to project the symbols upon the photosensitive layer material serves the additional purpose of sensing the characteristics and is therefore inserted in the path of the beam extending from the characteristic to the photoelectric cell. This affords a simple way of causing the focus-adjusting means to control the function of the optical sensing means sensing the characteristic of the symbol. Preferably, however, according to the present invention, the sensing means for sensing the characteristic representative of the width of the symbol includes a special lens system of invariable focus for the projection of the characteristic upon a stationary photoelectric cell. In this event the movable optical element associated with the sensing means is connected with the sheet feeding means by motion-transmitting means having a variable ratio of transmission, such ratio being preferably adjustable by the same adjusting member as is the lens system for projecting the symbols upon the sheet material. Hence, adjustment of this lens system for increasing or reducing the projections of the symbols upon the photoelectric sheet material will simultaneously vary the relation of the rate of feed to the adjustment of the lens system, thus varying the length of the feed.

The movable optical element connected with the feeding means mentioned hereinabove is preferably formed by a shutter. Alternatively it may be formed by a mirror or a prism.

In order that the duration of the feed may be determined by the projection of the characteristic upon the photoelectric cell at great accuracy, the following arrangement may be provided:

A carriage movable parallel to the cassette accommodating the photosensitive sheet material is preferably connected by the motion-transmitting means with the optical element, such carriage being reciprocable by a motor and adapted to be connected with the cassette by an electromagnetic clutch controlled by the optical sensing means. At the instant of the exposure of the photoelectric cell the electromagnetic clutch is disengaged so that from that instant on the carriage continues its motion alone leaving the cassette at rest. As a result, the length of the feed of the cassette is determined with great accuracy by the instant at which the optical means for sensing the characteristic will expose the photoelectric cell.

It would be possible, however, to produce the impulse for engaging the electromagnetic clutch by blacking out the photoelectric cell rather than by exposing same.

In a preferred embodiment of the present invention which is particularly simple, the engagement of the electromagnetic clutch is always effected by a cam controlled switch at the same instant of any cycle of operation, whereas the disengagement of the electromagnetic clutch is effected at different instants under control by the optical sensing means depending on the width of the symbol.

Depending on the position of the characteristic the clutch will thus be disengaged sooner or later and will, accordingly, effect a shorter or longer feed.

It was mentioned hereinabove that it is desirable to afford a possibility of controlling the spacing of the symbol projections independently of the differential width of the symbols so that with a given ratio of magnification the projections of the symbols may be moved closer together or may be spaced larger distances. This object may be achieved in a particularly simple and accurate manner with that species in which the movable optical element associated with the sensing means may be connected with the sheet feeding means by motion-transmitting means having a variable ratio of transmission. To this end, the setting member for the focus adjustment of the lens system of the symbol-projecting means is preferably connected with the setting member for adjusting the ratio of transmission by adjustable motion-transmitting means capable of manual adjustment, whereby the relative position of the two setting members may be varied for the purpose of increasing or reducing the letter spacing.

The lens system of variable focus includes at least a pair of lenses movable in the direction of the optical axis by cams. In the embodiment described in the main patent the adjustment of these lenses is effected by spindles having peripheral cam grooves. According to the present invention a more simple and more accurate adjustment is rendered possible, according to the present invention, in that a lever having its fulcrum axis extending parallel to the optical axis of the lens system and being mounted for displacement lengthwise of its fulcrum axis cooperates with a stationary cam and when displaced along its fulcrum axis is swung by said cam, such lever, in its turn, carrying a pair of cams each acting on one of the lenses.

Preferably an iris diaphragm is disposed between the two lenses, such diaphragm being adjustable by the magnification setting member and, preferably, is capable of additional manual adjustment with respect to the sensitivity of the photosensitive sheet material. As a result, the same exposure may be used with a small magnification and with a larger magnification.

Figure 2:
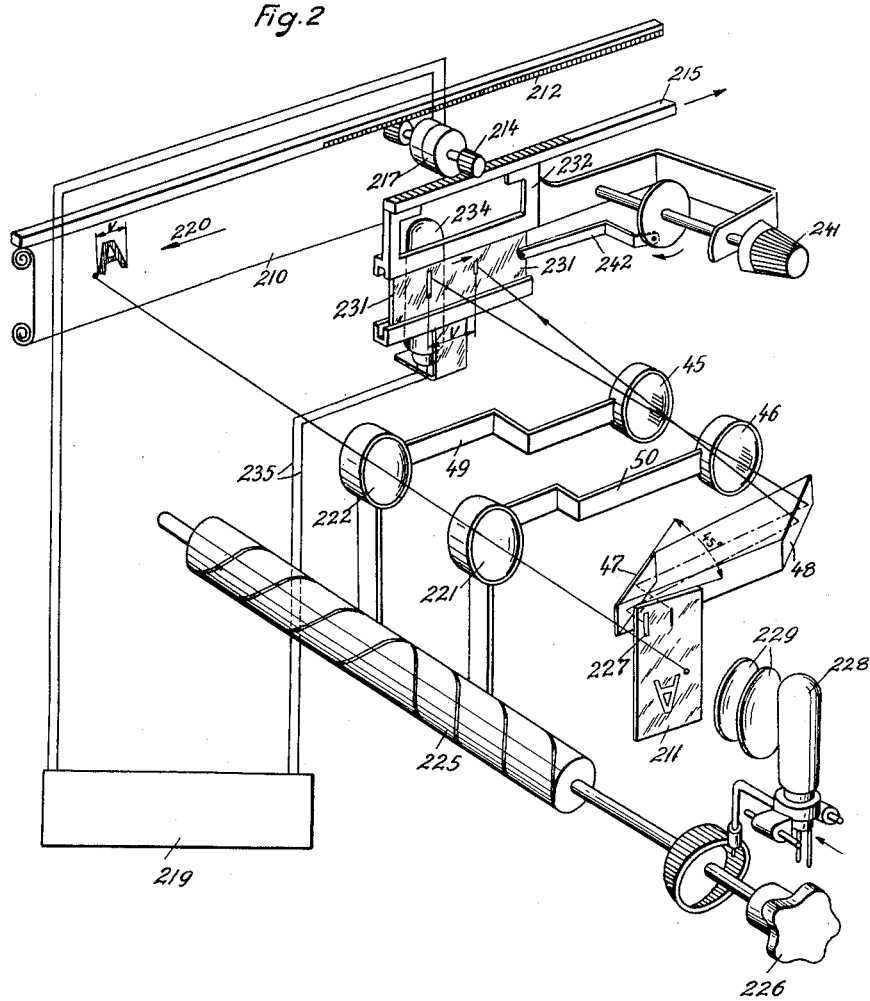

Further features of the present invention will appear from a detailed description of a plurality of species of the present invention shown in the accompanying drawings. It is to be clearly understood, however, that the invention is in no way limited to the details of such species but is capable of numerous modifications within the scope of the appended claims. In the drawings Fig. 1 is a perspective view of a photographic type-composing apparatus in which the same lens system serves to project the symbols upon the photosensitive sheet material and to project the characteristic controlling the feed upon the photoelectric cell, the feeding means being omitted, Fig. 2 is a similar perspective view of a photographic type-composing apparatus in which two separate optical lens systems of variable focus are provided for the projection of the symbols and for the projection of the characteristics of the symbols determining the letter spacing.

Figure 3:
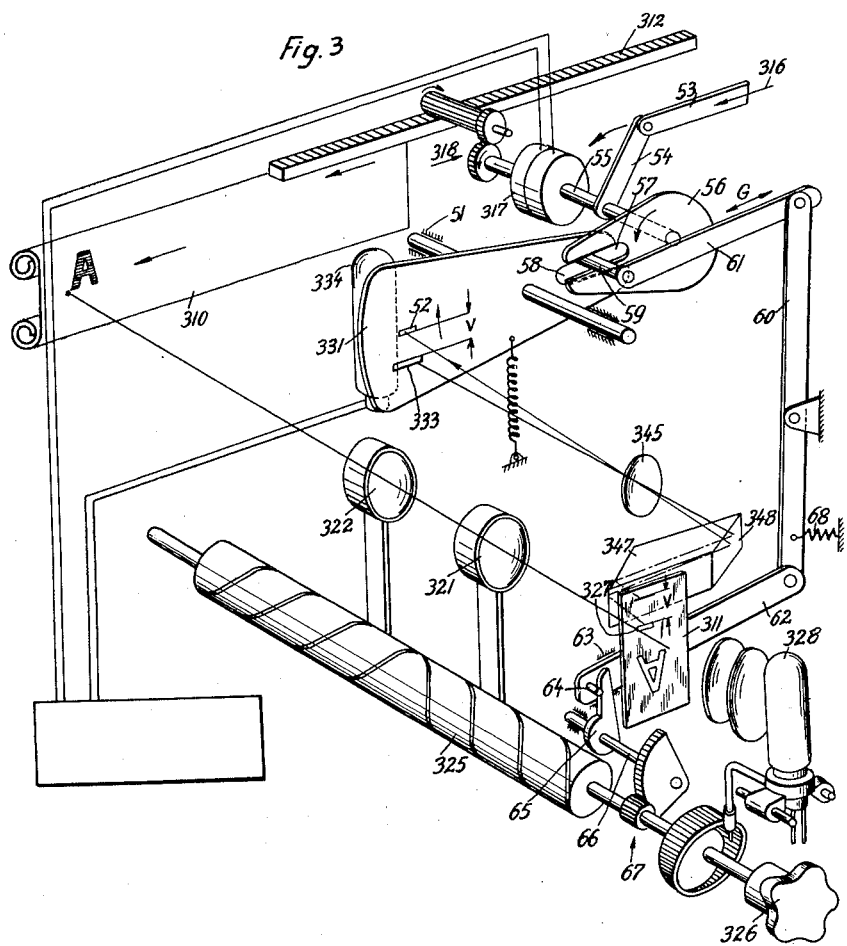

Fig. 3 is a perspective view of a photographic type-composing apparatus in which the lens system for the characteristic has a variable focus and in which the shutter is connected with the feeding means for feeding the sheet material by motion-transmitting means of a variable ratio of transmission.

Figure 4:
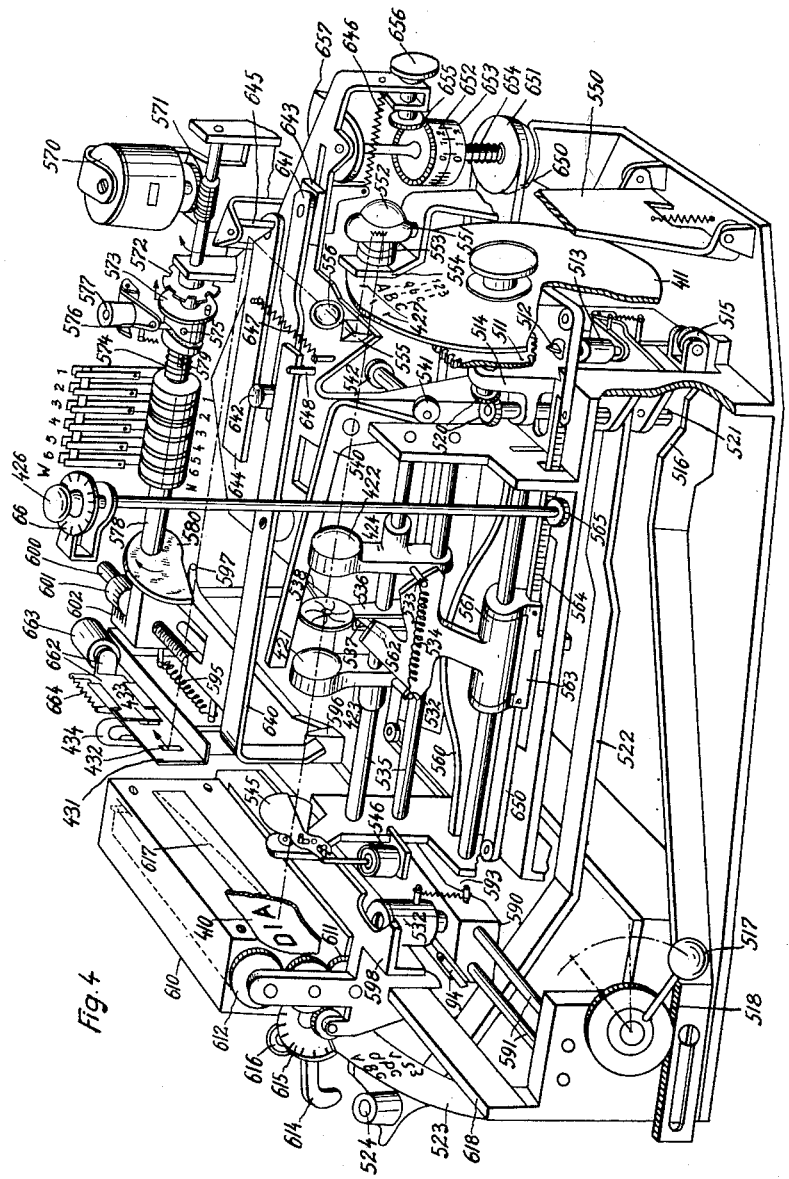
Figure 5:
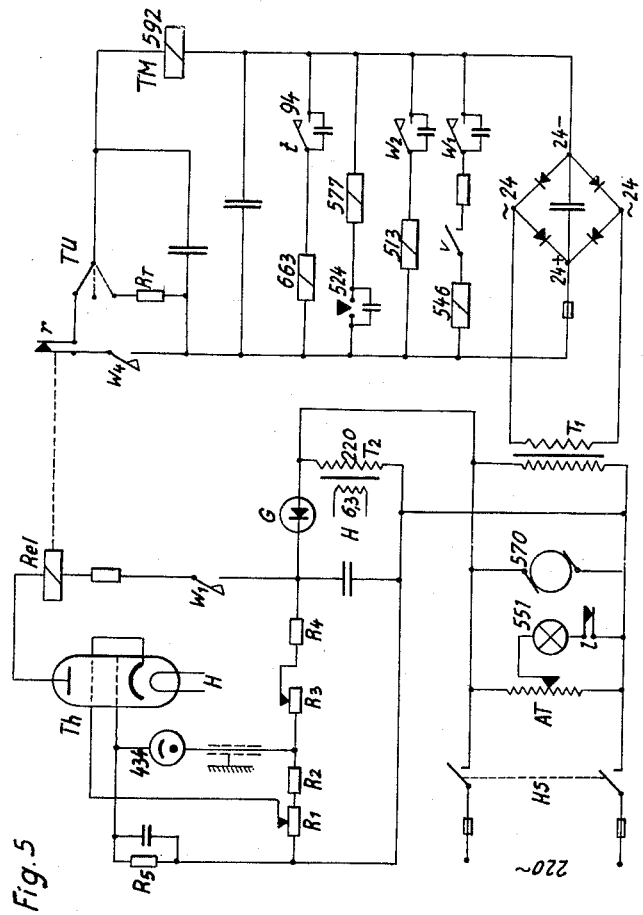

Fig. 4 is a perspective view of a photographic type-composing apparatus according to the present invention in which the means for sensing the characteristic includes an optical element connected with the sheet feeding means by motion-transmitting means having a variable ratio of transmission, such optical element being a mirror, said sensing means further including a lens system of variable focus projecting an image of the characteristic upon a stationary photoelectric cell, and Fig. 5 is an electrical circuit diagram associated with the apparatus shown in Fig. 4.

Character symbols provided on carriers 11 are successively projected upon a photosensitive sheet, for instance, a photographic film 10, the projections being spaced a distance which must be dimensioned in conformity with the differential width of the character symbols. In Fig. 1 it is the letter "A" that is being projected. Upon completion of any projection, a feed corresponding to the required letter spacing must be imparted to the support of the photosensitive sheet 10.

For that purpose the film 10 is mounted on a carriage represented for sake of simplicity as a horizontal rack 1 guided for lengthwise movement and meshing with a pinion 13 journalled in a stationary bearing. A second pinion 14 mounted in coaxial relationship to the pinion 13 for rotation meshes with a horizontal rack 15 extending transversely to the rack 12 and being slidably mounted for longitudinal displacement within the frame of the apparatus not shown. Motor-actuated means not shown in detail and diagrammatically indicated by the arrow 16 is operative when actuated to displace the rack 15 in the direction of the arrow a certain distance and to return the rack subsequently to its initial position.

The pinions 13 and 14 are connected by a disengageable electromagnetic clutch 17 electrically connected by a circuit 18 with the controlling appaartus 19. This apparatus serves the additional purpose of putting the motor-driven actuating means 16 into operation as soon as a switch not shown is closed. This switch is operative at the same time to effect closing of the circuit 18. That has the result of establishing the cooperative connection between the pinions 13 and 14 thus causing the support of the photosensitive sheet material 10 to be fed in the direction of the arrow 20. The switch may be a relay switch which closes automatically when the exposure of the symbol is terminated by interposition of a shutter not shown.

The required feed length must depend on the width of the character symbol on the symbol carrier 11 and on the magnification employed in projecting the symbol upon the sheet material 10.

As described in the main patent, this ratio of magnification may be varied by variation of the focal distance of the lens system. This lens system comprises a pair of lenses 21 and 22 each carried by a support 23 and 24. These supports are slidably mounted in the frame of the apparatus for displacement in the direction of their common optical axis. Follower members engaging cam grooves provided on the peripheral surface of a common rotary spindle 25 are mounted on the carriers 23 and 24. Such followers have not been illustrated in Fig. 1. The cam grooves have an opposite hand. When the spindle is rotated, the distance of the followers and consequently the focal distance of the lens system will be changed. The spindle for the purpose of its adjustment is provided with a handle 26.

Whereas in the embodiment of the invention shown and described in the main patent the characteristics of the symbol carriers comprise members projecting from the carriers and adapted to be sensed mechanically, according to the present invention the means sensing the characteristics is formed by optical sensing means including a photoelectric cell 34 and the characteristic provided on the symbol carrier 11 for the purpose of controlling the feed of the photosensitive sheet material is formed by a two-dimensional mark 27 determining the length of the feed of the support of the sheet material 10 by its shape or its position on the carrier 11, thereby determining the distance of the projections of the symbols.

In the embodiment shown the control of the feed is effected in that the optical sensing means sensing the mark 27 control the duration of the feed of the support of the photosensitive sheet material 10. Depending on the shape or the position of the mark 27 the instant depends at which the circuit 18 is opened again during the motion of the rack 15 in the direction of the arrow 16 disengaging the clutch 17 which subsequently remains in disengaged condition during the remainder of the forward movement of the rack 15 and during the return thereof. Owing to the disengagement of the clutch 17 the photosensitive sheet material 10 will remain at rest until the operator will have exchanged the symbol carrier 11 for a new one and will have exposed the new carrier. Then the cycle of operation is repeated in the described manner.

Hence, each intermittent feed movement commences at a predetermined instant during the cycle of operation and is terminated by an impulse produced by the sensing of the mark 27.

In the embodiment illustrated in Fig. 1 the same lens system 21, 22 of variable focus serves the dual purpose of projecting the symbol and of sensing the mark 27. To this end the source of light comprising an incandescent bulb 28 and a condenser lens system 29 has so large dimensions that the symbol as well as the mark 27 are disposed within the beam of light. Those rays exposing the field of carrier 11 accommodating the mark 27 are intercepted by a stationary mirror 30 interposed between the lens system 21, 22 and the support of the photosensitive sheet material 10 and are reflected by such mirror laterally in horizontal direction and are projected upon a shutter 31 having a vertical slot 33. This shutter is carried along by the rack 15 and, for this purpose, is mounted on a bracket 32 attached to the rack.

In the embodiment shown in Fig. 1 the mark 27 comprises a slot. A clearly defined image of the slot is projected upon the shutter 31 by the lens system. This image is shown at 32a in Fig. 1 on the shutter 31. The image 32a is faced a distance v from the slot 33 of the shutter when the parts assume the position illustrated. For this purpose the mirror 30 intersects the optical axis of the lens system at a point which is spaced equal distances from the shutter 31 and from the support of the photosensitive sheet material 10. Moreover, a photoelectrical cell 34 is mounted on the bracket 32 behind the slot 33, the cell being connected by electrical conductors 35 with the control apparatus 19. Since during the projection operation the carrier 11 of the symbol is at rest, the image 32a of the mark 27 projected upon the shutter 31 assumes a predetermined position with respect to the frame of the apparatus. The same is true for the operation occurring during the period in which the rack 15, the bracket 32, the shutter 31 carried thereby and the photoelectric cell 34 move in the direction of the arrow 16 and cause the rack 12 and the carrier of the photoelectric sheet material 10 to be fed. As soon as in this operation the slot 33 coincides with the projected image 32a of the mark 27, the rays projecting the image 32a will strike the photoelectric cell 34. As a result, this cell emits an impulse through the conductors 35 into the control apparatus 19 which in its turn opens the relay switch inserted in the circuit 18 whereby the electromagnetic clutch 17 will be disengaged. As a result, the rack 12 and the support of the photoelectric sheet material 10 will come to a stop while the rack 15 completes its stroke in the direction of the arrow 16 and subsequently returns to its initial position. The disengagement of the clutch 17 is therefore effected sooner or later depending on whether the mark 27 on the carrier 11 is disposed further to the right or to the left.

When the operator by turning the handle 26 varies the ratio of magnification of the projection of the symbol, this will cause a displacement of the image 32a of the mark 27 on the shutter 31. As a result, the instant of the photoelectric impulse will be shifted, whereby the length of the feed will be changed accordingly.

According to the invention this instant is determined in dependence on the position of the mark 27 by a movable optical element 31, 33 which is cooperatively connected with the feed means 12 by motion-transmitting elements. Moreover, it will appear that the adjusting means 25, 26 for the adjustment of the focal length of the lens system likewise influences the function of the optical sensing means 28, 29, 21, 22, 30 and 31 sensing the characteristic of the symbol. This is an important feature of the present invention.

It is desirable to afford a possibility of arbitrarily increasing or reducing the letter spacing of the projected symbols for a given size of the projections produced upon the photosensitive layer material 10 or, in other words, a possibility of additionally influencing the spacing of the symbol projections independently of the differential width of the symbols. To this end, the photographic type-composing apparatus is provided with a setting member 41 for varying the length of the feed.

More particularly, the shutter 31 is adjustably mounted upon the bracket 32 for displacement in the direction of feed indicated by the arrow 16. To this end, the shutter is constructed as a slide movably guided in grooves 39 of the bracket. Moreover, a crank disk 40 is rotatably supported on the bracket 32 and is provided with a knob 41 and is connected with the shutter 31 by a pitman 42. The range of adjustment is limited by a stop pin 43 mounted on the bracket 32 and cooperating with projections of the crank disk 40. By displacing the shutter 31 on the bracket 32 the operator may influence the instant at which the photoelectric cell 34 will be exposed and will terminate the feed of the support of the photosensitive layer material 10.

A measuring instrument 36 is cooperatively connected with the rack 12 such instrument including a hand 38 which on a graduation 37 indicates the entire length of the feed. This offers a possibility of adjusting the individual lines of the text composed successively. To this end the operator will first compose the line without exposing the photosensitive sheet material 10 and will then read the resulting length of the line. Then the operator will adjust the length of the feed accordingly by turning the knob 41 and will then repeat the composing operation causing the line to have the required length. During this second composing operation the layer material 10 will be exposed.

In the embodiments of the present invention illustrated in Figs. 2 and 3 a pair of lens systems is provided, one lens system serving the sole purpose of projecting the symbols upon the layer material and the other lens system serving the purpose of projecting the characteristic of the symbol carrier upon the photoelectric cell.

The individual elements of the photographic type-composing apparatus shown in Figs. 2 and 3 are provided with reference numerals differing from those of Fig. 1 by the addition of 200 or 300 respectively. Thus in Fig. 2 the cam spindle is designated 225 corresponding to the spindle 25 in Fig. 1. Therefore, the preceding description of the apparatus shown in Fig. 1 is applicable to Figs. 2 and 3 so that it will suffice to hereinafter explain the distinctions of the embodiments of Figs. 2 and 3 from that shown in Fig. 1.

The lens 221 and 222 may be made considerably smaller because they serve the sole purpose of projecting the character symbol upon the photosensitive layer material. Those rays of the source of light as fall upon the mark 227 are projected by a second lens system 45 and 46 upon the shutter 231 and, for this purpose, are twice diverted by mirrors 47 and 48 directly behind the symbol carrier 211 and are projected in a direction parallel to the optical axis of the lens system 221 and 222 at a considerable distance therefrom by the lens system 45, 46. The optical axis of this lens system is positioned parallel to that of the other lens system and, therefore, the rack 215 extends parallel to the rack 212. Otherwise the function is the same as that described with reference to Fig. 1.

Both lens systems have the same focal distance and are connected for common displacement by bars 49 and 50, such bars being so offset that the length of the beam extending from the carrier 211 to the lens 221 equals the length of the rays extending through the lens system 46. The amount of the offset therefore corresponds to the distance of the shutter 231 from the photosensitive sheet material 210. This arrangement offers the advantage that the rays sensing the characteristic 227 are not liable to adversely affect the photosensitive sheet material 210.

The point of intersection between the base line of the characters and the front edge of each character is the reference point that must be disposed on the optical axis owing to a suitable disposition of the carrier 211 relative to the lens system.

In the embodiment illustrated in Fig. 3 the second lens system serving the purpose of sensing the characteristic has a constant invariable focus and, therefore, may be formed by a single chromatic lens 345. Therefore, the mark 327 is projected upon the shutter at an invariable ratio of magnification. The position and the size of this image 333 of the mark upon the shutter 331, therefore, is independent of the magnification of the symbol. For the purpose of nevertheless affording a possibility of shifting the instant of the impulse produced by the photoelectric cell 334 in dependence on the ratio of magnification, the movable optical element, to wit, the shutter 331, is connected with the feeding means 312 for feeding the photosensitive layer material 310 by motion-transmitting means having a variable ratio of transmission. For this purpose the shutter 331 is mounted for pivotal movement.

In the embodiment illustrated the mark comprises a horizontal slot 327 of the carrier 311, such slot determining the length of the feed by its distance from the upper edge of the carrier 311. The controlling shutter 331 which is fixed upon a horizontal shaft 51 has a substantially horizontal slot 333 disposed radially with respect to the shaft 51. When the slot 333 coincides with the projection 52 of the mark 327, it permits the rays of light to fall upon the stationary photoelectric cell 334 disposed behind the shutter 331.

In this embodiment too, the controlling shutter 331 is cooperatively connected with the feeding means by motion-transmitting elements having a variable ratio of transmission. To this end, a feed motor not shown in detail is operative to impart an invariable stroke in the direction of the arrow 316 and thereafter a return stroke of equal length to a rod 53. This rod is a pitman pivotally connected to a crank 54 fixed to a shaft 55. This shaft is mounted in stationary bearings and is adapted to be cooperatively connected with the rack 312 through the intermediary of an electromagnetic clutch 317 and a gearing 318, the rack 312 being fixed to the support of the photosensitive layer material 310. Moreover, a lever 56 having a radial slot 57 is fixed to the shaft 55, said slot 57 being disposed adjacent to a rearward projection of the control shutter 331 which is likewise provided with a horizontal slot 58. A connecting pivot pin 59 extends through the two slots 57 and 58 and is mounted for displacement in a direction towards the shaft 51 or in a direction towards the shaft 55. This displacement may be effected by a linkage comprising a two-armed lever 60 and a pair of links 61 and 62. The links are pivotally connected to the ends of the lever and the upper link carries the pin 59, whereas the lower link is slidable in a guiding means 63 and is provided with a pin 64 which may be displaced by a cam lever 65 of a shaft 66. This shaft is connected with the cam spindle 325 by a gearing 67.

When the operator turns the shaft 66 with the aid of a handle 326 for the purpose of varying the magnification of the projection of the symbol upon the photosensitive sheet material, the cam lever 65 acting through the intermediary of the linkage 60, 61 and 62 will displace the pivot pin 59, thereby varying the ratio of transmission between the shafts 51 and 55 in such a manner as to shift the instant of the photoelectric impulse in the required manner. A spring 68 anchored to the lever 60 maintains the cooperative relationship between the pin 64 and the cam lever 65.

The motion-transmitting means connecting the movable optical element 331 of the sensing mechanism with the feeding means 312 at a variable ratio of transmission, therefore, is adjustable by the same setting member 326 that serves to adjust the lens system 321, 322 for projecting the symbol upon the photosensitive sheet material. This is an important feature of the present invention.

For the purpose of affording a possibility of influencing the length of the feed by hand, the lens 345 may be manually adjustable in vertical direction.

The embodiments described heretofore with reference to Figs. 1, 2 and 3 are capable of numerous modifications. Thus it is possible to control the engagement of the clutch 17, 217 or 317 at an instant depending on the position of the mark and to disengage the clutch in a predetermined instant of the cycle of operation. Moreover, the characteristic of the symbol need not be a slot but may be formed by a tongue provided at one edge of the symbol carrier or in a slot of the symbol carrier, such tongue producing the impulse by interruption of the light rays. Moreover, it would be possible to control the length of the feed in dependence on the intensity of the light beam rather than in dependence on the position of the mark. To this end the mark may be formed by an aperture of differential size controlling the length of the feed by determining the intensity of the beam of light passing through such aperture. Moreover, it would be possible to sense the mark provided on the carrier 11 in a separate projecting apparatus into which the symbol carrier is transported after the symbol has been projected upon the photosensitive sheet material.

In the embodiments described the symbol carrier 11 is at rest during the operation of photoelectrically sensing the field of the carrier provided with the mark. It is possible, however, to impart a feed movement to the symbol carrier after the symbol has been projected, such feed causing the sensing light beam to move in a manner determining the instant of the photoelectrical impulse in dependence on the position of the mark. When the apparatus is constructed in such manner, the control shutter 31, 231 or 331 could remain at rest.

Moreover, the embodiments shown in Figs. 1 and 2 could be modified by stationary mounting of the photoelectric cell on the frame of the apparatus provided that the photoelectric cell is large enough to have a zone of sensitivity extending over the entire distance $v$.

The embodiment illustrated in Fig. 4 will now be described in detail:

The symbol carrier formed by an exchangeable disk 411 is provided with three concentrically disposed annular rows of symbols, each annular row including 65 sectors, each being provided with one symbol. Thus, the disk 411 is provided with a total of 195 symbols, each symbol being a photographic negative (other than shown in the drawings). A controlling mark 427 in form of a transparent slot is associated with each of the transparent symbols, the peripheral spacing of the mark 427 from the radial line (not shown) confining its sector being proportional to the width of the symbol.

The operator may set up the desired symbol by means of a selector lever 522 so mounted that its end provided with a hand is movable across a symbol scale 523. In this operation a shaft 521 fixed to the lever 522 imparts rotation to the symbol disk 411 through the intermediary of a pair of bevel gears 520 until the selected carrier is brought into registry with a beam of light. To this purpose a swingable support 550 carries an illuminating apparatus comprising an incandescent lamp 551, a spherical reflector 552, a condenser lens 553 and a disk 554 absorbing infrared rays.

The axle carrying the symbol disk may be lifted two steps from the position shown to thereby bring the symbols of the inner concentrical annular rows into registry with the beam of light. For this purpose, the bearing bracket 514 carrying the symbol disk is mounted to be slidable in vertical direction and at its lower end carries a follower roller 515. By means of a handle 517, a gear 518 and a cam bar 516, the follower roller 515 may be lifted three steps.

The symbol carrying disk 411 is connected with a gear 511 having 65 teeth, each tooth corresponding to one of the symbol sectors of the disk 411. A detent tooth 512 adapted to be engaged with a tooth gap of the gear 511 is slidably mounted on the frame for radial adjustment relative to gear 511 and is movable for engagement by a magnet 513. This detent serves the purpose of accurately positioning the disk 411 to the proper angular position in order to bring the selected symbol into registry with the optical axis of the projector.

An image of the symbol so positioned is projected upon the photosensitive sheet material by the lens system comprising a pair of lenses 421 and 422 mounted for axial displacement along their common axis on guiding rods 535 fixed to the frame of the apparatus. Moreover, the two supports 423 and 424 of the lenses are relatively movable. Both movements may be effected by manipulation of a setting knob 426 provided with a graduation indicating the degree of amplification of the projection. The knob 426 is mounted on a vertical shaft journalled in suitable bearings not shown fixed to the frame of the apparatus. A pinion 565 fixed to the lower end of the vertical shaft is in mesh with a rack 564. This rack is slidably guided for longitudinal movement in the frame of the apparatus in a direction parallel to the optical axis and for this purpose is fixed to a bracket 563 slidably mounted on a rod fixed to the frame of the apparatus. The bracket is formed with a pair of flanges embracing such rod and between such flanges a member 561 is slidably and pivotally mounted on the rod to be carried along by the rack 564. The pivotal member 561 is kept by a suitable spring (not shown) in permanent engagement with a stationary cam bar 560 fixed to the frame of the apparatus and operative during the axial displacement of the member 561 to lift and lower the same. At its upper end the pivotal member 561 is formed with a triangular plate constituting a portion of a cylinder coaxially disposed with respect to the pivotal axis of the member 561. The upper edges of the triangular plate engage pins 532 and 533 projecting from the lens supports 423 and 424. Therefore, the pivotal member 561 when lifted and lowered by the cam 560 is operative to displace the lens supports 423 and 424 on the guide rods 535. The pins 532 and 533 are connected by a helical spring 534 insuring permanent engagement of the pins with the head of the pivotal member 561 during the movement thereof. The edges of the member 561 cooperating with the pins 532 and 533 constitute cams which are so shaped as to produce a displacement of the lenses required to change the focus of the lens system at the same time permanently keeping the image sharply focused on the photosensitive sheet material 410.

Moreover, the head of the pivotal member 561 is provided with a pin 562 engaging a vertical slot 537 of a support 536 which is slidably guided on the rods 535 and carries a diaphragm. As a result, such diaphragm will be always kept in the center between the two lenses during the axial displacement of the latter.

The diaphragm may be of the adjustable iris type.

From the foregoing description it will appear that the means for adjusting the lenses is so constructed that at any position of the lenses the image of the symbol selected will be focussed sharply upon the photosensitive sheet material 410 the optical magnification being continuously variable, preferably between 0.5 and 3.

Moreover, a photographic shutter 545 is provided in alignment with the optical axis, such shutter being operable by a solenoid 546. The optical system comprising the pair of lenses 421 and 422 may be supplemented by a third lens therebetween, if desired, such third lens being mounted, for instance, on the support of the iris diaphragm 536.

With the aid of the apparatus described a picture may be taken on the sheet material 410 from the selected symbol with the desired magnification ratio set up. After the exposure has been completed, the photosensitive sheet material 410 must be fed through a letter space. For this purpose the following means are provided:

An electric motor 570 acting through the intermediary of a suitable worm gear transmission 571 permanently imparts rotation to a clutch member 572 carried by suitable journals fixed to the frame of the apparatus. When an electromagnet 577 is energized by operation of a press-button switch 524 mounted on the selector lever 522, the magnet will temporarily attract its armature, thereby lifting a pin 576 fixed to such armature from a helical groove provided in a clutch section 573 mounted for axial displacement. Upon disengagement of the pin 576 the clutch section 573 is moved by a spring 574 into engagement with the driven clutch section 572. A transverse pin 575 provided in the movable clutch section 573 engages a slot 579 of a cylindrical drum 578 to impart rotation to the latter. When the magnet 577 is deenergized, the pin 576 carried by its armature will reengage the helical groove, whereby the clutch will be disengaged again after the cylindrical drum 578 will have completed a single revolution.

During this revolution of the drum 578 a cam 580 fixed thereto will engage a pin 597, after the drum has been turned through a predetermined angle, whereby a feed slide 590 carrying the pin 597 will be moved along a pair of guide rods 591 fixed to the frame and extending in horizontal direction transversely to the optical axis and beneath the latter. As soon as the pin 597 drops from the rise of the cam 580, the feed slide 590 will be returned to its initial position by a traction spring 595, such initial position being defined by abutment of the feed slide against a stop screw 600 manually adjustable with the aid of a graduation 601 provided on the periphery of the head of the stop screw and of a graduation 602 provided on the frame.

It is the purpose of the feed slide 590 during its forward feed motion imparted by the cam 580 to carry along the cassette 610 encasing the photosensitive sheet material 410 until the desired feed has been completed. Then the feed slide 590 will be uncoupled from the cassette 610 and will complete its reciprocation alone. For this purpose the feed slide is provided with an upright pin on which a cup-shaped magnet 592 is slidably mounted. Upon energization of the magnet it will be attracted by a horizontal angle bar 598 fixed to the cassette 610, whereby the latter will be clutched to the feed slide. Upon deenergization of the magnet the cassette will stop abruptly and remain at rest under the effect of permanent friction. The cassette is carried by a support to which the angle bar 598 is rigidly fixed, such support being slidably mounted on a stationary horizontal bar 618 of the frame of the apparatus. This bar 618 extends horizontally transversely to the optical axis and parallel to the guide rods 591 of the feed slide 590. The friction between the cassette and the guide bar 618 is sufficient to abruptly stop the cassette upon deenergization of the magnet 592 without any overthrow. By exact timing of the instant at which the magnet 592 is deenergized the length of the feed may be determined accurately.

The above-described engagement of the detent 512 with the gear 511 has had the effect of accurately aligning the control slot 427 associated with the selected symbol relative to the projector. Hence, the control slide will be exposed to the beam of rays produced by the lens system 553 and these rays deflected by a prism 555 to a projector lens 556 and again reflected by a rotary mirror 645 will form an image of the slot 527 on a screen 531, such image being indicated at 432. A shutter slide 662 is movably guided on the screen 431 and adapted to be moved by a magnet 663 contrary to the tendency of a spring 664, whereby a slot 433 provided in the screen 431 will be exposed. A photoelectric cell 434 is mounted behind the slot 433 on a suitable support fixed to the frame of the apparatus.

The movable optical element which is cooperatively connected with the feeding means by a suitable train of motion-transmitting elements and is operative to time the projection of the mark 427 upon the photoelectric cell 434 is formed by the pivotal mirror 645 in this embodiment of the invention. Therefore, this pivotal mirror is connected with the means for feeding the photosensitive sheet material 401 by a train of motion-transmitting elements having a variable ratio of transmission. This train of motion-transmitting elements will now be described: A member 596 fixed to the feed slide 590 is operative when the movement of the feed slide 590 in forward direction commences to engage a two-armed lever 640 fulcrumed upon a vertical pin fixed to the frame of the apparatus. This lever when rocked by the feed slide engages a pin 642 carried by a pivotal arm 641 and operative in its turn to act on an arm 644 of the pivotal mirror 645. A spring 647 anchored to the frame of the apparatus tends to hold the arm 644 in permanent engagement with the pin 642 and to urge this pin into engagement with the two-armed lever 640 which in its initial position engages a stop pin 648 fixed to the frame of the apparatus. The ratio of transmission of this train of motion-transmitting members interposed between the movable optical element 645 of the sensing mechanism and the means 590 for feeding the photosensitive sheet material 410 depends on the distance of the pin 642 from the pivotal axes of the arm 644 and the lever 640. This distance is continuously variable. For this purpose the arm 641 carrying the pin 642 is pivotally mounted on a vertical pin of a slidable member 643 guided for horizontal displacement on a suitable guideway provided on the frame of the apparatus and extending substantially parallel to the optical axis. By displacement of the slidable member 643 upon such guideway the ratio of transmission of the above-described train of motion-transmitting members is continuously variable. Hence, the slidable member 643 constitutes the setting member determining the ratio of transmission.

This setting member is connected with the setting member 426 for the adjustment of the magnification, such connection being established by another chain of motion transmitting elements. This second chain is manually adjustable in such a manner that the relative position of the two setting members 426 and 643 may be varied. Such variation has the effect of extending or reducing the normal letter spacing. This other chain of motion-transmitting elements will now be described:

The ends of the rack 564 cooperatively connected with the setting member 426 by the pinion 565 is connected with the ends of a steel strip 650 constituting a belt extending across a plurality of idle rollers. One of such idle rollers is shown at 651. This roller just as the other idle rollers is journalled in the frame of the apparatus. A cam 657 is rotatably mounted beneath the idle roller 651 coaxially thereto and is connected therewith by a pair of coaxial shafts adapted to be connected by a friction clutch comprising clutch sections 652 and 653. This friction clutch is kept in permanent engagement by a spring 654. When the operator turns the setting member 426 to vary the magnification ratio of the projection, such adjustment is transmitted by the chain of motion-transmitting elements 565, 564, 650, 651, 652 and 653 upon the cam 657. A follower member 643 is kept by a spring 646 in engagement with the cam 657 and, therefore, is adjusted accordingly. The described chain of motion-transmitting elements may be manually adjusted by relative angular displacement of the clutch sections 652 and 653, whereby the normal letter spacing on the photosensitive sheet material 410 may be increased or reduced. For this purpose an adjusting knob 656 is provided having a shaft rotatably mounted in a suitable bracket fixed to the frame of the apparatus. A pinion 655 is fixed to such shaft and engages bevel gear teeth provided on the clutch section 652. Hence, when the operator turns the knob 656, the clutch sections 652 and 653 are relatively angularly displaced contrary to the friction therebetween.

In Fig. 5 the electrical circuit diagram is shown. The electrical circuit comprises three portions, to wit, (1) the supply circuit, (2) the control circuit, and (3) the operating circuit.

First, the supply circuit will be explained. When a main switch HS is closed, the apparatus will be connected with a suitable source of current, for instance, an A.C. source of a voltage of 220 v. As a result, the bulb 551 of the projector, the electric motor 570 and a pair of transformers T1 and T2 will be supplied with current. The bulb 551 of the projector is supplied with current via an autotransformer AT with a reduced voltage. A switch 1 is arranged in series with the bulb 551. This switch is so mounted as to be opened automatically when the operator for the purpose of exchanging the symbol disk 411 for another disk carrying other symbols will swing the support 550 aside.

Now the control circuit will be explained: The photoelectric cell 434 is inserted in the grid circuit of a gas-filled grid controlled tube T$h$ and will fire this tube at the instant when hit by the image 432. The plate current of the tube T$h$ energizes a relay R$el$ which will open its normally closed contact $r$. The tube T$h$ and the photoelectric cell 434 are energized by direct current supplied by a rectifier G connected to the source of current in series with resistors R1–R4. The heating voltage for the tube is supplied by the transformer T2. A switch $w1$ is mounted in series with the plate of the tube, such switch belonging to a group of cam controlled switches $w1$–$w6$ adapted to be actuated by suitable cams mounted on the cylindrical drum 578.

Now the operating circuit will be described: This circuit includes the above-mentioned cam actuated switches $w2$, $w3$, and $w4$. The winding TM of the clutch magnet 592 is connected by the switch $w4$ to the D.C. terminals 24+ and 24− of a rectifier supplied with A.C. current from a transformer T1 as long as the normally closed relay contact $r$ is closed. The further details of the operating circuit will appear from the explanation of the function following hereinafter:

When the operator depresses the press-button switch 524, the winding of the magnet 577 will be connected with the D.C. contact 24+ and 24−, whereby a single revolution will be imparted to the cam drum 578. During this revolution the switch $w1$ will be closed first and will render the tube T$h$ ready for operation. Moreover, the switch $w2$ will be closed and will energize the aligning magnet 513. The cam switch $w3$ will be closed and will control the magnet 546 of the photographic shutter 545 to thereby effect exposure of the photosensitive layer material 410 with the image of the symbol. Thereafter the cam controlled switch w4 will be closed and will energize the clutch magnet 552, whereby the cassette 610 will be put in motion. The magnet 592 is provided with a normally open relay contact 94 which when closed will energize the magnet 663, whereby the slot 433 will be opened. As soon as the image 432 of the slot will have moved up to the opened slot 433 and will hit the photoelectric cell 434, voltage will be applied to the control grid of the tube T$h$, causing the tube to fire, whereby the relay R$el$ will be energized. This relay will open its normally closed contact $r$, whereby the clutch magnet 592 will be deenergized. As a result, the cassette 610 will stop and remain at rest while the feed slide 590 continues its motion. The operating contact 94 will open again and will deenergize magnet 663 which then permits the shutter 662 to be moved by the spring 664 to a position closing the slot 433. Thereafter, the switch w2 will be opened and will cause disengagement of the detent tooth 512. Moreover, the cam controlled switch w1 will be opened and will disconnect the plate voltage, thereby extinguishing the tube T$h$ again.

A switch TU inserted between the resting contact $r$ and the clutch magnet 592 enables the operator to cut out the clutch magnet 592 altogether. This is desirable, for instance, where two symbols are to be projected successively without any intermediate feed of the cassette. This is desirable, for instance, where a symbol is to be placed upon another symbol.

Moreover, the switch TU enables the operator to energize the magnet 592 via a resistor $R_T$ independently of the cam controlled switch w4 and the relay R$el$ and to keep the magnet 592 in energized condition for any desired period of time. This offers a possibility, for instance, of displacing the cassette a measurable distance forwardly or rearwardly by manipulation of the stop screw 600 for the purpose of adjusting the length of a line.

A manually operable switch $v$ is arranged in series with the magnet 546. By opening this switch the operator may prevent the exposure and may, therefore, compose the type idly.

Moreover, contacts not shown are provided for disabling the apparatus automatically when the cassette 610 arrives at its end position.

A number of condensers and resistors are shown in the circuit diagram which need not be explained in detail.

The cassette 610 is so mounted as to be removable from its guiding means. It encases a transverse horizontal shaft on which a film supply reel is mounted. A gear 611 is fixed to such shaft which engages a gear 612 of a feed roller. This feed roller and the supply reel are connected via a free-wheeling clutch having a lever 614. The operator by imparting a pivotal movement to this lever may feed the film, i.e. the photosensitive layer material 410 upwardly a step to thereby move the following line into position behind the window of the darkslide to render the latter ready for exposure. This window is provided with a shutter 617 adapted to be opened and closed by means of a lever. The desired line spacing may be adjusted with reference to a scale 615 which is cooperatively connected with the reel and the feed roller. When the operator turns the lever 614 into abutting position against a stop screw 616, this will feed the film a distance corresponding to a line space set up by the adjustable stop screw 616.

The diaphragm 536 is preferably an iris diaphragm. Its aperture is adjustable by a setting lever 538 mounted to be slidable on a stationary cam 540 to be rocked thereby. The inclination of this cam may be adjusted with the aid of a manually adjustable cam 541 which is connected with a rotatable knob 542.

When the ratio of magnification is changed by displacement of the pivotal member 561 and when the iris diaphragm is carried along by such member, the aperture of the diaphragm will be changed accordingly. As a result, the period of exposure need not be changed but may be the same with all magnifications. With the aid of the rotatable knob 542 the cam bar 540 may be so adjusted that it will control the aperture of the diaphragm in conformity with the sensitivity of the film material employed at any time.

The embodiment of the invention illustrated in Fig. 4 is particularly adapted to be constructed as a portable apparatus to be placed on a table. With the aid of this apparatus any desired type may be composed on a photosensitive film or paper in a semi-automatic manner. The composed type may be used as a pattern for offset printing, intaglio printing, letters printing or the like or may be used directly.

The size of the type may vary between 6 and 36 points (approximately 3 to 18 mm.$^2$). All requirements occurring in practice may be complied with by the use of a pair of exchangeable symbol disks 411, each being provided with 195 symbols. The text is composed in form of lines or columns, the spaces between the characters or between the words being justified in the conventional manner. The apparatus is of particular utility for composing texts for advertisements, pamphlets, titles, lists, legends, signatures, graphical drafts, signs, etc. The apparatus is also particularly fit as an accessory to large automatic photographic type-composing machines. Without difficulties a skilled operator may compose up to 40 characters per minute by means of the apparatus described hereinabove with reference to Figs. 4 and 5.

Any desired amplification or reduction of the image projected upon the photosensitive sheet material may be set up in a simple manner manually with the aid of the knob 426 cooperating with a simple graduation. Any adjustment of the knob 426 causes the lens system 421, 422 to be so adjusted in the direction of the optical axis that the focus will be varied without requiring any adjustment of the photosensitive sheet material 410 and of the symbol disk 411 in the direction of the optical axis. Upon completion of the photographic exposure the feed is automatically effected moving the cassette 611 one letter space of the composed text. The distance of this feed is automatically controlled in dependence on the width of the symbol and of the magnification ratio. However, the operator may vary the feed arbitrarily either by adjusting the stop screw 600, thereby adding or subtracting a constant distance to the letter spacing and/or by adjusting the knob 656, thereby changing the letter spacing in proportion to the width of the symbol just recorded.

The photographic type-composing apparatus shown in Fig. 4 is operated as follows: First, the operator starts the electric motor 570 and closes the switch HS to turn on the source of light 551 of the projector. Then the size of the characters of the text to be composed is set by manipulation of the knob 426. Moreover, the desired symbol is selected by manipulation of the lever 522 imparting rotation of the symbol disk 411. Then the operator must depress the switch button 524, whereby the following operations are produced: A single revolution is imparted to the cam drum 578. The symbol disk 411 is accurately aligned and arrested in the manner described hereinabove. The photographic shutter 545 is opened to cause exposure. Thereafter feeding motion is imparted to the dark-slide 611. The shutter 662 is actuated opening the slot 433 and closing the same again after the clutch magnet 592 will have been actuated to stop the dark-slide. The detent tooth 512 is disengaged and the clutch 573 is disengaged, whereupon the apparatus is ready for the projection of the following symbol.

When the operator desires to project the same symbol again increasing the size thereof to twice the previous amount, he must adjust the knob 426 accordingly, thereby adjusting the lens system and the diaphragm so as to meet the requirements. The location of the image 432 of the characteristic 427, however, will not be affected by such adjustment of the knob 426.

Let it be assumed for the purpose of explanation that in the first type-composing operation just described the ratio of the speed of travel of the cassette 610 to that of the image 432 amounts to 1:1. Then now in the second composing operation this ratio must be changed to be 2:1 in order to fit the increased amplification of the symbol. In other words, the cassette must travel twice the previous distance before it is stopped by deenergization of magnet 592. This effect, is automatically attained by the longitudinal displacement of the lever 641 derived from the movement of the pivotal member 561 through the intermediary of the chain of motion-transmitting elements 564, 650, 651, 653, 652, and 657.

As a result of the displacement of the pin 642 carried by the lever 641 the ratio of transmission between the levers 640 and 644 is increased to twice its previous figure, whereas the speed of travel of the dark-slide 601 remains unvaried.

Now the pivotal mirror 645 will move the image 432 of the characteristic 427 with a velocity reduced to half of its previous rate.

Between the words composed of the projected symbols a space may be inserted which may be selected by the operator from six different spaces so as to suit the size of the symbols. The selection of a suitable space may be effected by selecting a suitable sector on the symbol disk 411. These sectors are provided with different marks 427 but are not provided with any character symbols.

The apparatus may also be used to compose text having an extended type spacing. For this purpose the stop screw 600 must be unscrewed the desired additional distance after the first symbol has been recorded. The spring 595 will pull the slide 590 against the stop screw 600, thereby causing the slide 590 to start from a new initial position disposed further back. The lever 640 and, consequently, the image 432 do not follow such movement into a new position because the lever 640 remains in contact with the stop pin 648.

As a result, the feed-slide 590 and the cassette 610 must first travel through a certain additional distance before the feed controlled by the mark 427 in dependence on the width of the symbol will occur.

When capital characters are to be set, it is often desired to change the letter spacing between successive characters arbitrarily so as to differ from the standard spacing. This may be desirable, for instance, when the capital letters TA are to be composed. In that event it may be desirable to reduce the letter spacing in order to move the A beneath the horizontal top bar of the T. Another example that will illustrate the desirability of affording means for varying the character spacing is the composition of IK, since it is desirable to increase the distance between these capital characters. In selecting the proper spacing, the operator may rely upon his experience and memory or on samples or on a table and the spacing may be set up in the same manner as described hereinabove with reference to the extended character spacing. First, the cassette must be clutched with the feed slide prior to the adjustment of the stop screw 600 by suitable actuation of the switch TU. If the normal letter spacing is to be reduced (undercutting) the cassette after having been clutched to the feed slide 590 must be moved back by hand into engagement with the stop screw 600. Thereafter, in both cases the cassette must be disengaged from the feed slide 590 before the image of the symbol is recorded and the amount set up at 601 and 602 must be set back.

The justification of the line may be effected either by varying the spaces between the composed words or by varying the character spaces in proportion to the magnification or by both steps. When the operator wishes to effect the justification of the line by varying the spacing between the letters he must proceed as follows: For the purpose of setting lines of equal predetermined length, half of the first line is composed and then the rest is composed in an idle manner by disconnecting the shutter magnet 546 by means of the switch v. Then the rest of the line read from a graduation after the last word has been composed will be equally distributed over the spaces between the words composed in an idle manner. Then the line may be completed using the spaces so found. For this purpose the above-described six sector fields on the symbol disk may be used, such fields carrying characteristics of different sizes. It is also possible to compose the entire line in an idle fashion and to subsequently distribute the remaining distance over the word spaces of the line in the manner described hereinabove.

When the operator wishes to justify the line by varying the character spacing in proportion to the character sizes, he may proceed as follows: By composing the line in an idle manner, the remaining distance is found. Assuming, for instance, that the distance amounts to one twelfth of the entire length of the line, then the normal character spacing will be increased one twelfth. For this purpose the knob 656 must be so actuated as to place the figure 13 on the periphery of the clutch section 652 above the figure 12 marked on the periphery of the clutch section 653. The graduations provided on the clutch sections are in registry in the normal condition and correspond to the optical magnification graduation associated with the knob 426.

The typographic quality of the composed text is not affected by such a minor increase of the character spacing. Moreover, this method may have the advantage to avoid an undue increase of the spaces between the words of the composed text.

Any suitable photosensitive film or paper material may be used. Preferably, however, material of a medium sensitivity and great brilliancy will be used. Also stripping films may be employed or reversing films when it is desired to reverse the record into a negative.

In composing a normal text the operator preparatory to the composing operation must select and insert the proper symbol disk 411, set up the required magnification and select a photosensitive material having the required sensitivity. During the composing operation he need manipulate the selecting lever 22 and the press-button 24 only.

When the line has been composed completely, the lever 614 must be manipulated to produce a line spacing operation as well as the return of the dark-slide to the initial position for the following line. The operation of the apparatus for special problems has been described hereinabove. With respect to the operation it must be remarked that a complete automation of the line justification can be effected by the additional provision of an expensive mechanism exceeding the scope of the objects of this apparatus. Such additional mechanism is justified in large photographic type-composing machines only having a high composing speed.

If desired, the guide bar 618 may be equipped with a plurality of disengageable stops which are adjustable by reference to a suitable graduation so that the commencement of the line or tabulating spaces may be set up repeatedly and accurately.

While the invention has been described in connection with a number of preferred embodiments thereof, it will be understood that it is capable of further modification, and this application, is intended to cover any variations, uses, or adaptations of the invention following, in general, the principles of the invention and including such departures from the present disclosure as come within known or customary practice in the art to which the invention pertains, and as fall within the scope of the invention or the limits of the appended claims.

What I claim is:

1. Photographic type-composing apparatus comprising a symbol carrier provided with at least one typographic symbol of a certain width and with a characteristic located at a point of said carrier representative of said width, a support of light-sensitive sheet material, a photographic projection system including relatively movable lenses disposed between said carrier and said support and a source of light for projecting an image of said symbol upon said light-sensitive sheet material at a magnification ratio depending on the relative position of said lenses, ratio-changing means for relatively adjusting said lenses with respect to said symbol carrier and said support, feeding means for imparting an intermittent feed movement to said support, optical sensing means including a photoelectric cell for sensing the location of said characteristic and for producing a controlling impulse, said optical sensing means including a movable optical element cooperatively connected with said feeding means for timing said impulse with respect to the operation of said feeding means in dependence on the location of said point, means controlled by said impulse for controlling the duration of said intermittent feed movement in dependence on the timing of the impulse to variably determine the length thereof in dependence on the location of said characteristic, means controlling said projection system and operative, whenever said intermittent feed has been completed and said support is at rest, for rendering said system effective to project said image upon said sheet material, and motion-transmitting means having a variable ratio of transmission for cooperatively connecting said movable optical element with said feeding means, said ratio of transmission being variable by said ratio-changing means.

2. Apparatus as claimed in claim 1 in which said motion-transmitting means having a variable ratio of transmission comprises a pair of levers swingable about parallel axes, one of said levers being connected with said movable optical element for movement therewith and the other one of said levers being connected with said feeding means for movement therewith, a member disposed between said levers in contact therewith and mounted for adjustment longitudinally of said levers and for movement with said levers to transfer the movement of one of said levers to the other one of said levers, and connecting means for cooperatively connecting said member with said ratio-changing means for adjusting said member longitudinally of said levers, when the magnification ratio is changed.

3. Apparatus as claimed in claim 2 in which said connecting means includes a cam rotatable by said ratio-changing means and a follower connected to said member.

4. Photographic type-composing apparatus comprising a symbol carrier provided with at least one typographic symbol of a certain width and with a characteristic located at a point of said carrier representative of said width, a support of light-sensitive sheet material, a photographic projection system including relatively movable lenses disposed between said carrier and said support and a source of light for projecting an image of said symbol upon said light-sensitive sheet material at a magnification ratio depending on the relative position of said lenses, ratio-changing means for relatively adjusting said lenses with respect to said symbol carrier and said support, a reciprocatory member, driven means for reciprocating said member, clutch means for connecting said reciprocatory member to said support for imparting an intermittent feed movement to said support, optical sensing means including a photoelectric cell for sensing the location of said characteristic and for producing a controlling impulse, said optical sensing means including a movable optical element cooperatively connected with said reciprocatory member for timing said impulse with respect to the movement of said reciprocatory member in dependence on the location of said point, said clutch means being cooperatively connected with said photoelectric cell for control by said impulse to thereby control the duration of said intermittent feed movement in dependence on the timing of the impulse, and means controlling said projection system and operative, whenever said intermittent feed has been completed and said support is at rest, for rendering said system effective to project said image upon said sheet material.

5. Apparatus as claimed in claim 4 in which said clutch means is constituted by an electromagnetic clutch, said apparatus further comprising a cam-controlled switch for effecting engagement of said electromagnetic clutch, a cam rotatable by said power-driven means for actuating said cam-controlled switch and means controlled by said photo-electric cell for effecting the disengagement of said electro-magnetic clutch in a timed manner under control by said impulse.

6. Photographic type-composing apparatus comprising a symbol carrier provided with at least one typographic symbol of a certain width and with a characteristic located at a point of said carrier representative of said width, a support of light-sensitive sheet material, a photographic projection system including relatively movable lenses disposed between said carrier and said support and a source of light for projecting an image of said symbol upon said light-sensitive sheet material at a magnification ratio depending on the relative position of said lenses, ratio-changing means for relatively adjusting said lenses with respect to said symbol carrier and said support, feeding means for imparting an intermittent feed movement to said support, optical sensing means including a photoelectric cell for sensing the location of said characteristic and for producing a controlling impulse, said optical sensing means including a movable optical element cooperatively connected with said feeding means for timing said impulse with respect to the operation of said feeding means in dependence on the location of said point, means controlled by said impulse for controlling the duration of said intermittent feed movement in dependence on the timing of the impulse to variably determine the length thereof in dependence on the location of said characteristic, means controlling said projection system and operative, whenever said intermittent feed has been completed and said support is at rest, for rendering said system effective to project said image upon said sheet material, motion-transmitting means having a variable ratio of transmission for cooperatively connecting said movable optical element with said feeding means, an adjustable member coordinated to said motion-transmitting means for determining the ratio of transmission thereof, and connecting means connecting said adjustable member with said ratio-changing means for varying said ratio of transmission concurrently with said magnification ratio, said connecting means being manually adjustable for the optional change of said ratio of transmission for any given magnification ratio.

7. Apparatus as claimed in claim 6 in which said connecting means comprises a rotatable cam, means including a manually adjustable friction clutch for connecting said ratio-changing means with said cam for rotation of the latter and a follower coordinated to said cam and connected with said adjustable member.

8. Photographic type-composing apparatus comprising a symbol carrier provided with at least one typographic symbol of a certain width and with a characteristic representative of said width, a support of light-sensitive sheet material, a photographic projection system including relatively movable lenses disposed between said carrier and said support and a source of light for projecting an image of said symbol upon said light-sensitive sheet material at a magnification ratio depending on the relative position of said lenses, ratio-changing means for relatively adjusting said lenses with respect to said symbol carrier and said support, feeding means for imparting an intermittent feed movment to said support, optical sensing means including a photoelectric cell for sensing said characteristic of said symbol carrier, control means influenced by said sensing means for controlling said feed movement to variably determine the length thereof in dependence on said characteristic, and means controlling said projection system and operative, when said intermittent feed has been completed and said support is at rest, for rendering said system effective to project said image upon said sheet material, said ratio-changing means including a pivotal member mounted for pivotal movement about an axis extending parallel to the common axis of said relatively movable lenses and for longitudinal displacement along said pivotal axis, and a stationary cam cooperating with said pivotal member to impart pivotal movement thereto, when said longitudinal displacement is imparted to said member, said member being formed with a pair of cam faces, each cam face acting on one of said lenses for displacement thereof along said optical axis.

9. Apparatus claimed in claim 8 further comprising an iris diaphragm disposed between said lenses and adjustable by said ratio-changing means in dependence on said magnification ratio.

10. Apparatus as claimed in claim 8 further comprising an iris support mounted for movement along the common optical axis of said lenses, an iris diaphragm mounted on said support, means connecting said pivotal member with said iris support for common longitudinal displacement, a stationary cam adjacent to said iris support and a follower carried by said iris diaphragm for adjustment of its aperture and cooperating with said stationary cam.

11. Apparatus claimed in claim 10 further comprising means for manually adjusting said cam to thereby adjust said iris diaphragm independently of said magnification ratio.

12. Photographic type-composing apparatus comprising a rotatable symbol disk provided with typographical symbols of different widths and with characteristics disposed adjacent to said symbols and located at points representative of said widths, a film cassette adapted to accommodate a light-sensitive sheet material mounted for movement parallel to said disk, a photographic projection system including a pair of lenses having a common optical axis and mounted for individual adjustment along said axis between said symbol disk and said cassette and a source of light for projecting an image of one of said symbols upon said cassette at a magnification ratio depending on the adjustment of said lenses, ratio-changing means for relatively adjusting said lenses with respect to said symbol disk and said support, a reciprocatory carriage mounted for movement parallel to the movement of said cassette, a power-driven cam for reciprocating said cassette, a spring connected to said carriage for keeping same in engagement with said cam, an adjustable stop for engagement by said carriage under the force of said spring, an electromagnetic clutch connecting said carriage with said cassette, a first lever pivotally mounted about a fulcrum axis and engaging said carriage to be pivoted by the movement thereof, a second lever mounted for pivotal movement about an axis extending parallel to said fulcrum axis, a reflector fixed to said second lever, a motion-transmitting member interposed between said levers and in engagement therewith and mounted for adjustment lengthwise of said levers and movable transversely thereof, manually adjustable means connecting said motion-transmitting member with said ratio-changing means, a stationary screen having a slot, a photoelectric cell on the side of said screen remote from said reflector and in registry with said slot, an auxiliary projector associated with said symbol disk for projecting an image of one of said characteristics upon said reflector and by the latter upon said screen, means controlled by said photoelectric cell for de-energizing said electromagnetic clutch, when the image of said characteristic projected upon said screen has been moved by said reflector to registry with said slot and said photoelectric cell, a manually operable lever for rotating said symbol disk to thereby select one of said symbols and one of said characteristics for projection, a set of switch-actuating cams cooperatively connected with said power-driven cam, and switches operable by said switch-actuating cams for controlling said power-driven cam and for rendering said system effective to project said images, after said cam has effected the movement of said carriage in a direction away from said stop.

13. Photographic type-composing apparatus comprising a symbol carrier provided with at least one typographic symbol of a certain width and with a characteristic located at a point of said carrier representative of said width, a support of light-sensitive sheet material, a photographic projection system including relatively movable lenses disposed between said carrier and said support and a source of light for projecting an image of said symbol upon said light-sensitive sheet material at a magnification ratio depending on the relative position of said lenses, ratio-changing means for relatively adjusting said lenses with respect to said symbol carrier and said support, feeding means for imparting an intermittent feed movement to said support, optical sensing means including a photoelectric cell for sensing the location of said characteristic and for producing a controlling impulse, said optical sensing means including a pivotally mounted reflector rotatable by said feeding means for timing said impulse with respect to the operation of said feeding means in dependence on the location of said point, means controlled by said impulse for controlling the duration of said intermittent feed movement in dependence on the timing of the impulse to variably determine the length thereof in dependence on the location of said characteristic, and means controlling said projection system and operative, whenever said intermittent feed has been completed and said support is at rest, for rendering said system effective to project said image upon said sheet material.

14. Apparatus as claimed in claim 4, further comprising adjustable means for determining the starting point of the movement of said reciprocatory member imparted thereto by said power-driven means.

References Cited in the file of this patent

UNITED STATES PATENTS

| 2,356,620 | Schade | Aug. 22, 1944 |
| 2,682,814 | Higonnet | July 6, 1954 |
| 2,714,843 | Hooven | Aug. 9, 1955 |
| 2,787,654 | Peery | Apr. 2, 1957 |

FOREIGN PATENTS

| 1,113,397 | France | Dec. 5, 1955 |
| 1,121,986 | France | May 14, 1956 |
| 1,124,399 | France | June 25, 1956 |